United States Patent
McLaughlin

(10) Patent No.: US 10,675,972 B2
(45) Date of Patent: Jun. 9, 2020

(54) DRIVE SHAFT BEARING SUPPORT ASSEMBLY AND MULTI-RADIUS CAP FOR BEARING SUPPORT HOUSING

(71) Applicant: Toyota Motor Engineering & Manufacturing North America, Inc., Plano, TX (US)

(72) Inventor: Daniel J. McLaughlin, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/101,774

(22) Filed: Aug. 13, 2018

(65) Prior Publication Data

US 2020/0047612 A1    Feb. 13, 2020

(51) Int. Cl.
*F16C 35/04* (2006.01)
*B60K 17/24* (2006.01)
*B60B 35/18* (2006.01)

(52) U.S. Cl.
CPC ............ *B60K 17/24* (2013.01); *F16C 35/042* (2013.01); *B60B 35/18* (2013.01)

(58) Field of Classification Search
CPC ...... F16C 9/00; F16C 9/02; F16C 9/04; F16C 9/06; F16C 27/00; F16C 27/04; F16C 27/06; F16C 2326/06; F16C 35/00; F16C 35/042; B60B 35/18; B60K 17/24
See application file for complete search history.

(56) References Cited

U.S. PATENT DOCUMENTS

| 3,009,748 A * | 11/1961 | Pitner ..................... F16C 19/46 |
| | | 384/581 |
| 4,511,191 A * | 4/1985 | Kitamura .............. F16C 35/067 |
| | | 384/536 |
| 4,854,747 A * | 8/1989 | Siebert .................. F16C 35/067 |
| | | 384/447 |
| 5,234,271 A | 8/1993 | Lindstrom |
| 6,334,714 B1 * | 1/2002 | Harimoto .............. F16C 21/005 |
| | | 384/569 |

(Continued)

FOREIGN PATENT DOCUMENTS

| CN | 201573743 U | 9/2010 |
| CN | 201824876 U | 5/2011 |

(Continued)

OTHER PUBLICATIONS

Machine Translation of DE 102013222728 (Year: 2015).*

Primary Examiner — Alan B Waits
(74) Attorney, Agent, or Firm — Christopher G. Darrow; Darrow Mustafa PC

(57) ABSTRACT

A drive shaft bearing support assembly is disclosed. The assembly may include a bearing support housing structured to be mountable to a portion of a vehicle. The bearing support housing may define a cavity structured for receiving a portion of a bearing therein. The assembly may also include a bearing support housing cap structured to be securable to the bearing support housing to secure the bearing in the cavity. The bearing support housing cap may be structured to contact the bearing only along two discrete regions of contact when the bearing support housing cap is secured to the bearing support housing to secure the bearing in the cavity.

23 Claims, 14 Drawing Sheets

(56) References Cited

U.S. PATENT DOCUMENTS

| | | | |
|---|---|---|---|
| 6,672,768 B2 * | 1/2004 | Borsch | B60K 17/24 |
| | | | 267/140.2 |
| 8,544,591 B2 | 10/2013 | Felchner et al. | |
| 8,646,566 B1 | 2/2014 | Bouzit et al. | |
| 8,997,917 B1 * | 4/2015 | Mesa | F16C 17/02 |
| | | | 180/359 |
| 2003/0072510 A1 | 4/2003 | Zimmermann | |
| 2009/0185769 A1 * | 7/2009 | Morton | F16C 25/08 |
| | | | 384/563 |

FOREIGN PATENT DOCUMENTS

| | | |
|---|---|---|
| CN | 201890143 U | 7/2011 |
| CN | 201941594 U | 8/2011 |
| CN | 202242984 U | 5/2012 |
| CN | 102529712 A | 7/2012 |
| CN | 202623929 U | 12/2012 |
| CN | 202669485 U | 1/2013 |
| CN | 102975615 A | 3/2013 |
| CN | 202896296 U | 4/2013 |
| CN | 203063673 U | 7/2013 |
| CN | 203344741 U | 12/2013 |
| CN | 103640435 A | 3/2014 |
| CN | 103786570 A | 5/2014 |
| CN | 103832210 A | 6/2014 |
| CN | 205202732 U | 5/2015 |
| CN | 204458862 U | 7/2015 |
| CN | 204458981 U | 7/2015 |
| CN | 204641397 U | 9/2015 |
| CN | 105128659 A | 12/2015 |
| CN | 105128660 A | 12/2015 |
| CN | 204870562 U | 12/2015 |
| CN | 105235505 A | 1/2016 |
| CN | 105365560 A | 3/2016 |
| CN | 205149529 U | 4/2016 |
| CN | 205523413 U | 8/2016 |
| DE | 10201112063 | 6/2013 |
| DE | 102013222728 * | 5/2015 |
| EP | 1415847 A1 | 5/2004 |
| FR | 2905981 A1 | 3/2008 |
| JP | 2001187918 A | 7/2001 |
| JP | 2006090343 A | 4/2006 |
| JP | 2008074400 A | 4/2008 |
| JP | 2008527257 A | 7/2008 |
| JP | 2008207801 A | 9/2008 |
| JP | 2009006990 A | 1/2009 |
| JP | 2010173590 A | 8/2010 |
| JP | 2010184623 A | 8/2010 |
| JP | 2010201994 A | 9/2010 |
| JP | 2012026495 A | 2/2012 |

* cited by examiner

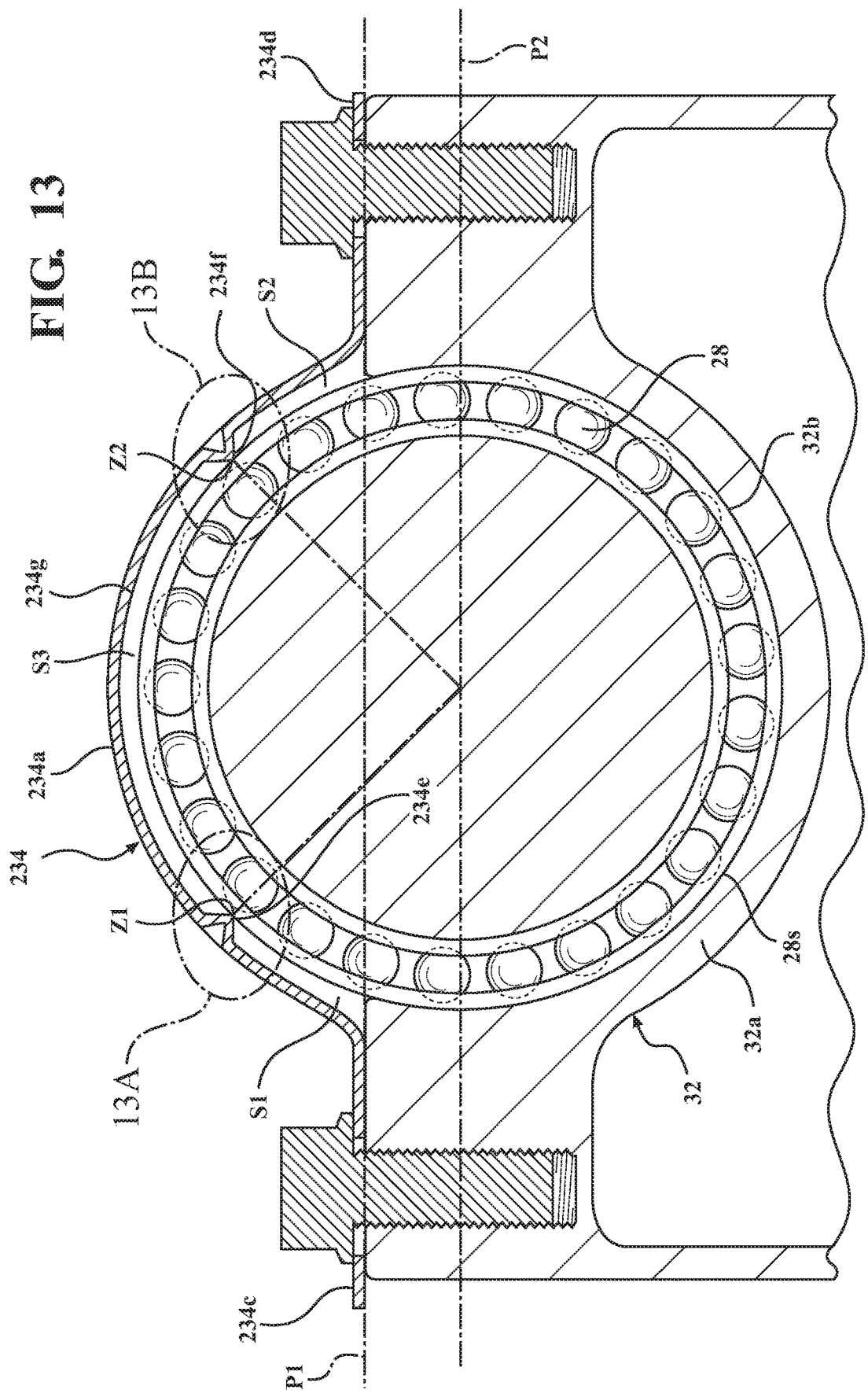

DRIVE SHAFT BEARING SUPPORT ASSEMBLY AND MULTI-RADIUS CAP FOR BEARING SUPPORT HOUSING

TECHNICAL FIELD

The present disclosure relates to mechanisms for securing a portion of a drive shaft to another portion of a vehicle, for purposes of stabilizing the drive shaft during use.

BACKGROUND

Due to the length of a drive shaft, a bracket or other device may be mounted to a portion of a vehicle located proximate an unsupported portion of a drive shaft, and may be structured to grip a portion of the shaft and secure the shaft to stabilize the drive shaft during use. The bracket or other device may support a bearing mounted to the drive shaft to enable rotation of the drive shaft at the supported location. However, the bearing and bracket structure may expand relative to each other if they are formed from dissimilar metals and due to heat generated during drive shaft use or transferred in the engine compartment. This expansion may generate additional clearances in the supporting bracket or other device, resulting in undesirable noise and vibration.

SUMMARY OF THE INVENTION

In one aspect of the embodiments described herein, a drive shaft bearing support assembly is provided. The assembly may include a bearing support housing structured to be mountable to a portion of a vehicle. The bearing support housing may define a cavity structured for receiving a portion of a bearing therein. The assembly may also include a bearing support housing cap structured to be securable to the bearing support housing to secure the portion of the bearing in the cavity. The bearing support housing cap may be structured to contact the bearing only along two discrete regions of contact when the bearing support housing cap is secured to the bearing support housing to secure the portion of the bearing in the cavity.

In another aspect of the embodiments described herein, a cap is structured to be securable to a bearing support housing of a bearing support assembly to secure a bearing in the bearing support housing. The cap may include a bearing support portion including a first surface and a second surface, the first surface having a first radius and the second surface having a second radius. The bearing support portion may be structured to contact the bearing along the first surface to provide a first discrete region of contact between the bearing support portion and the bearing. The bearing support portion may also be structured to contact the bearing along the second surface to provide a second discrete region of contact between the bearing support portion and the bearing. The cap may also being structured to be spaced apart from the bearing at locations other than the first discrete region of contact and the second discrete region of contact when the cap is secured to the bearing support housing to secure the bearing in the bearing support housing.

BRIEF DESCRIPTION OF THE DRAWINGS

The accompanying drawings, which are incorporated in and constitute a part of this specification, illustrate embodiments described herein and together with the description serve to explain principles of embodiments described herein.

FIG. 13 is a schematic cross-sectional end view of a drive shaft bearing support assembly including another alternative embodiment of a bearing support housing cap.

DETAILED DESCRIPTION

Figure 1:
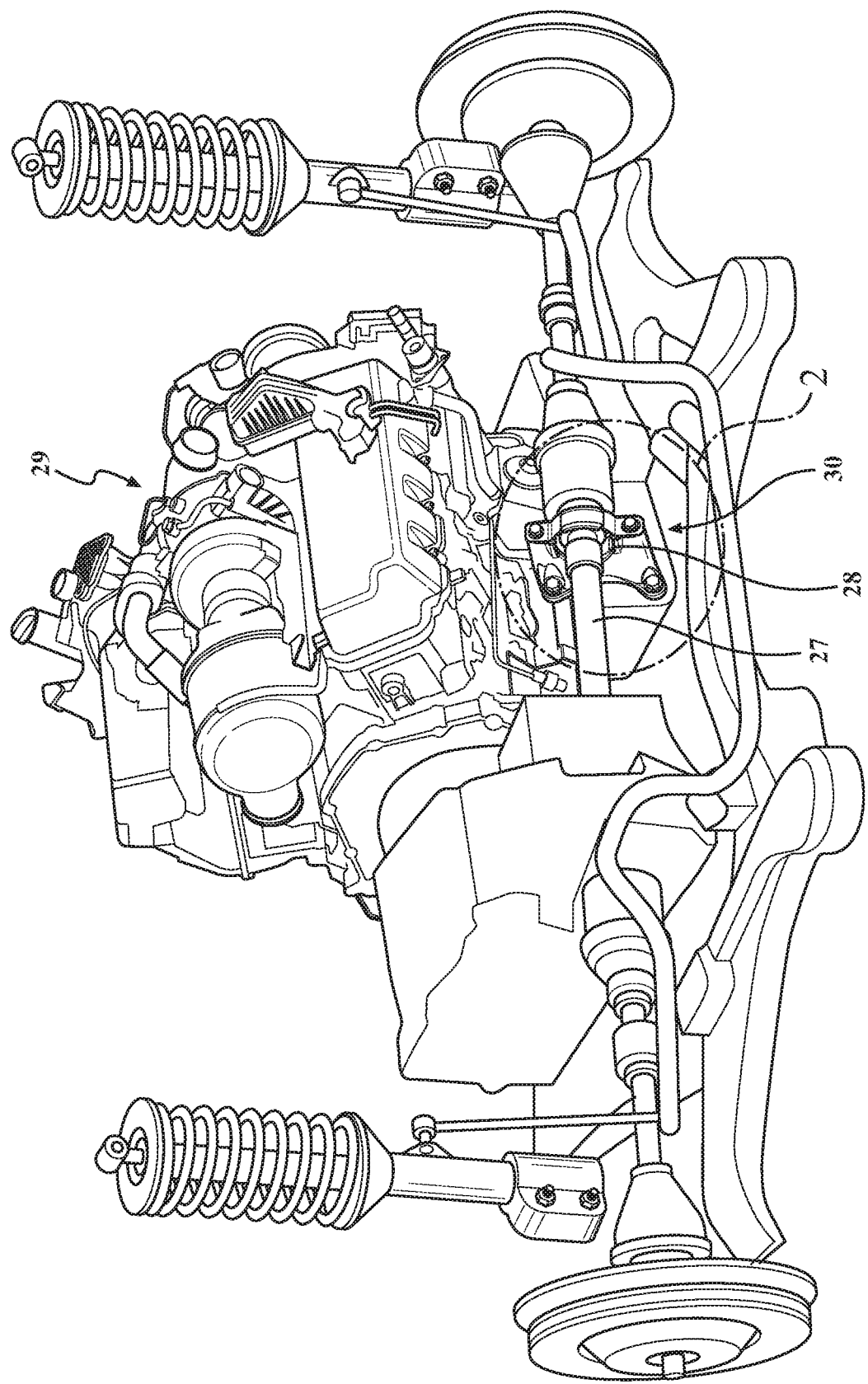
FIG. 1 is a schematic perspective view of a drive shaft bearing support assembly in accordance with an embodiment described herein, shown mounted on an engine block.

In one or more arrangements described herein, a drive shaft bearing support assembly is provided for securing a portion of a drive shaft to another portion of a vehicle during rotation of the drive shaft. A bearing mounted on the drive shaft may be secured in the bearing support assembly, to support the shaft during use. The bearing support assembly may include a bearing support housing mountable to a portion of the vehicle and defining a cavity structured for receiving a portion of the bearing therein. A bearing support housing cap is applied to the bearing support housing to secure the bearing in the cavity. The bearing support housing cap is structured to contact the bearing only along two discrete regions of contact (rather than along all or most of the portion of the bearing not in contact with the support housing) when the bearing support housing cap is secured to the bearing support housing to secure the bearing in the cavity.

In the various embodiments described herein, similar elements may have similar reference characters, except where noted.

Figure 2:
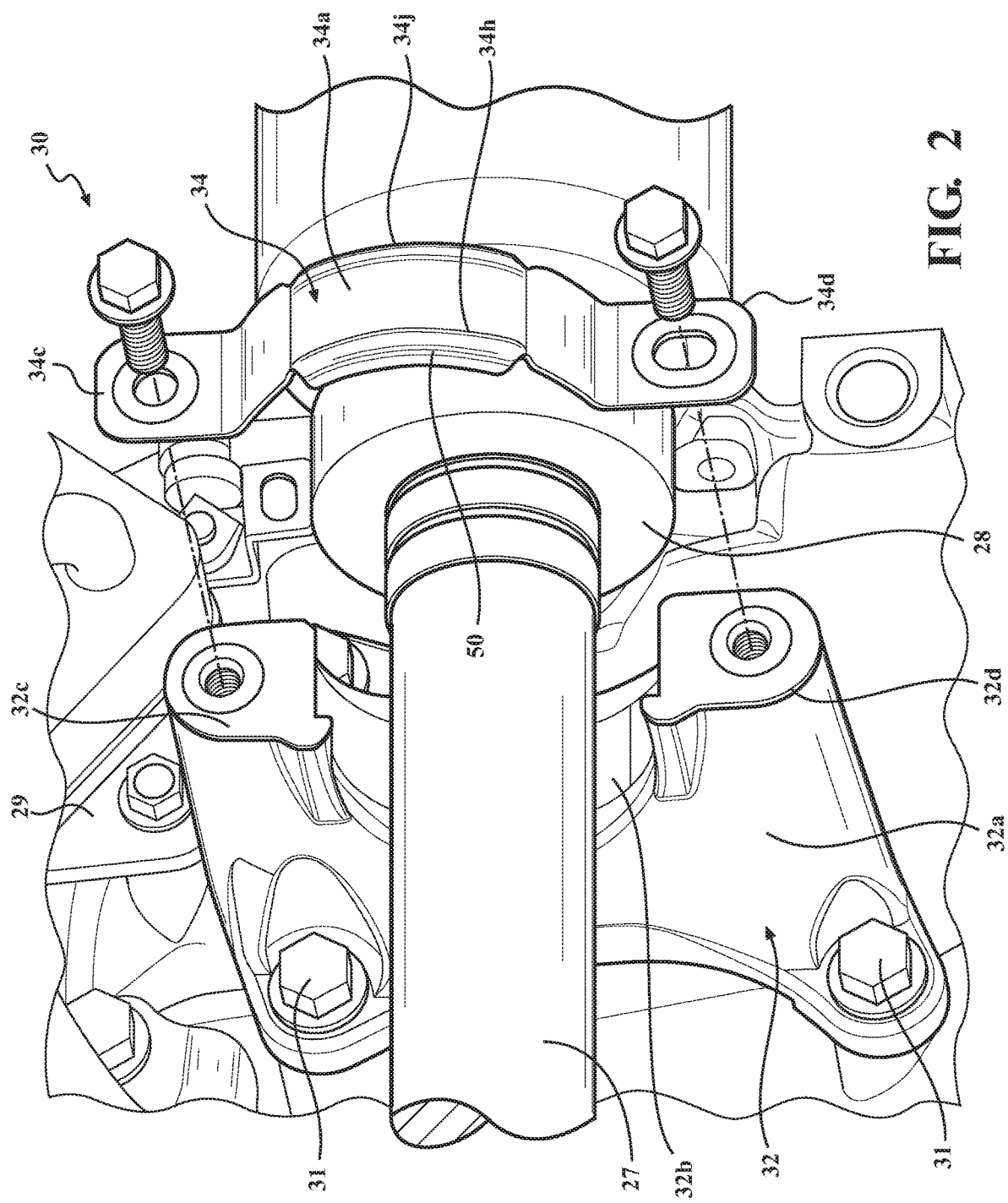
FIG. 2 is a magnified view of the portion of FIG. 1 showing an exploded view of the drive shaft bearing support assembly.

FIG. 1 is a schematic perspective view of a drive shaft bearing support assembly (generally designated 30) in accordance with an embodiment described herein, shown mounted on an engine block 29. FIG. 2 is a magnified view of the portion of FIG. 1 showing an exploded view of the drive shaft bearing support assembly 30. The drive shaft bearing 28 may be applied to a drive shaft 27 using an interference fit and may be used to rotatably support and secure the drive shaft as the shaft rotates during operation of the engine. The drive shaft bearing 28 may be mounted on the engine block 29 or to another portion of the vehicle to position and secure the drive shaft bearing 28 and drive shaft 27 during operation of the engine. While the bearing support assembly 30 is shown mounted to an engine block 29, the bearing support assembly 30 may alternatively be mounted to another portion of the vehicle, depending on the vehicle design, space constraints, and other pertinent factors.

Referring to the drawings, in one or more arrangements, the drive shaft bearing support assembly 30 may include a bearing support housing 32 and a bearing support housing cap 34. Referring in particular to FIGS. 1-8, the bearing support housing 32 may be structured to be secured to the engine block 29 or other portion of the vehicle using bolts 31 or any other suitable securement mechanism. The bearing support housing 32 may be formed from any material or materials suitable for the purposes described herein, for example, aluminum or steel, using any suitable fabrication method(s).

In one or more arrangements, the bearing support housing 32 may include a base portion 32a which defines a cavity 32b for receiving a portion of the bearing 28 therein. The cavity radius 32r may be equal to a radius of an outermost surface 28s of the bearing which is contacted by the bearing support housing cap 34 as described herein, within manufacturing tolerance limits of the bearing outermost radius 28r and the bearing support housing cavity radius 32r. A bearing 28 is determined to be received in the cavity 32b when the bearing is positioned in the cavity in its desired operational relationship (i.e., as the bearing is supported when it is in actual use) with respect to the bearing support housing 32, and ready for application of the bearing support housing cap 34 to the bearing support housing 32 without further movement or adjustment of the bearing 28 in the cavity 32b.

The bearing support housing 32 may also define a first housing cap attachment surface 32c structured to provide a location for attachment of a first securement portion 34c of the bearing support housing cap 34 to the bearing support housing 32. The bearing support housing 32 may also define a second housing cap attachment surface 32d positioned opposite the first housing cap attachment surface 32c and structured to provide a location for attachment of a second securement portion 34d of the bearing support housing cap 34 to the bearing support housing 32.

Figure 3:
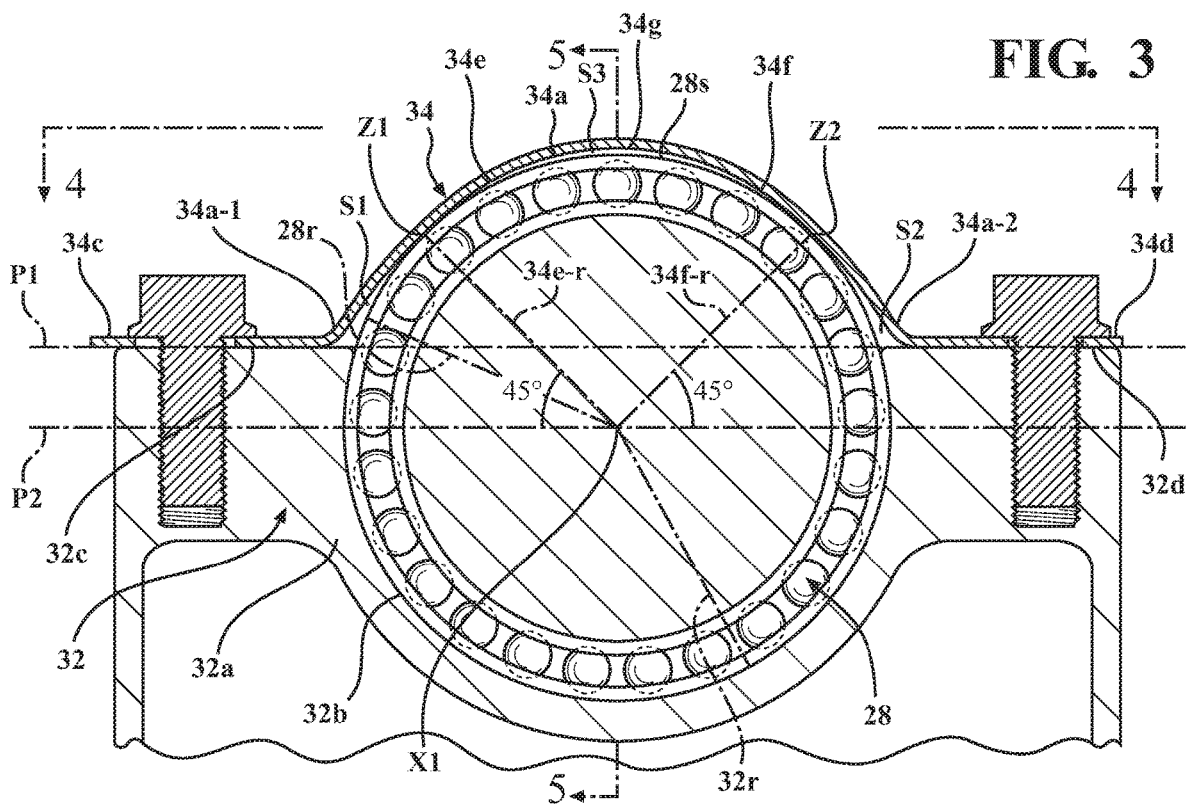
FIG. 3 is a schematic cross-sectional end view of the drive shaft bearing support assembly of FIGS. 1 and 2.
Figure 4:
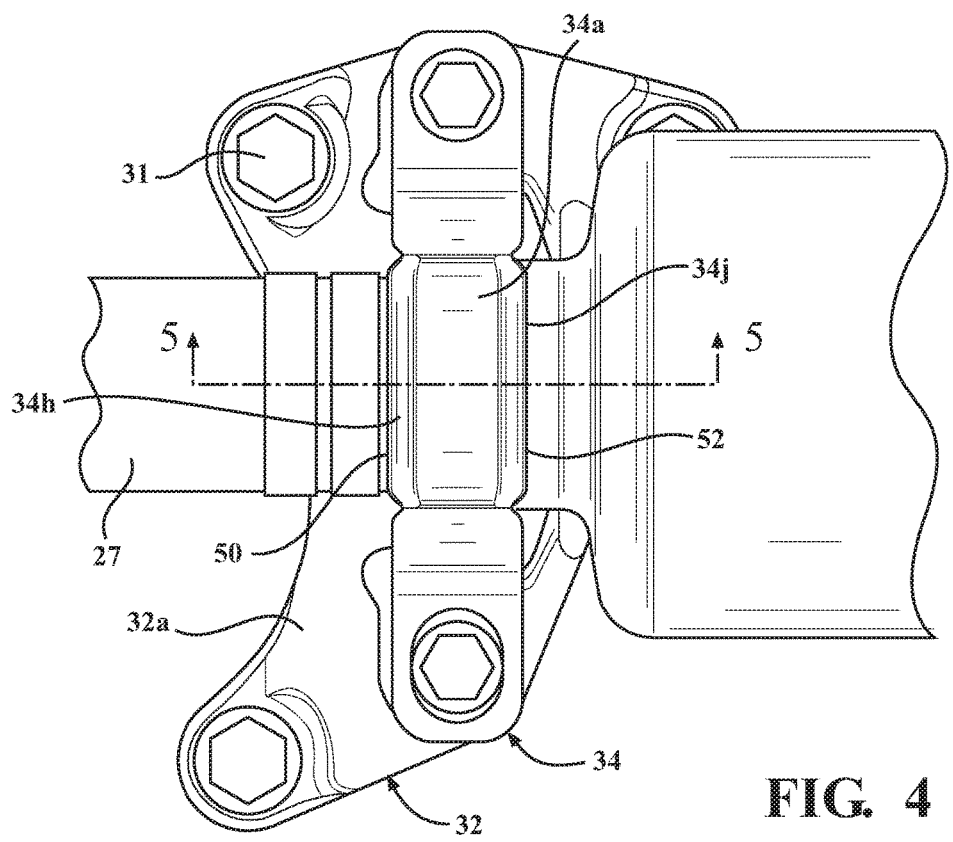
FIG. 4 is a schematic plan view of the drive shaft bearing support assembly of FIGS. 1 and 2.
Figure 5:
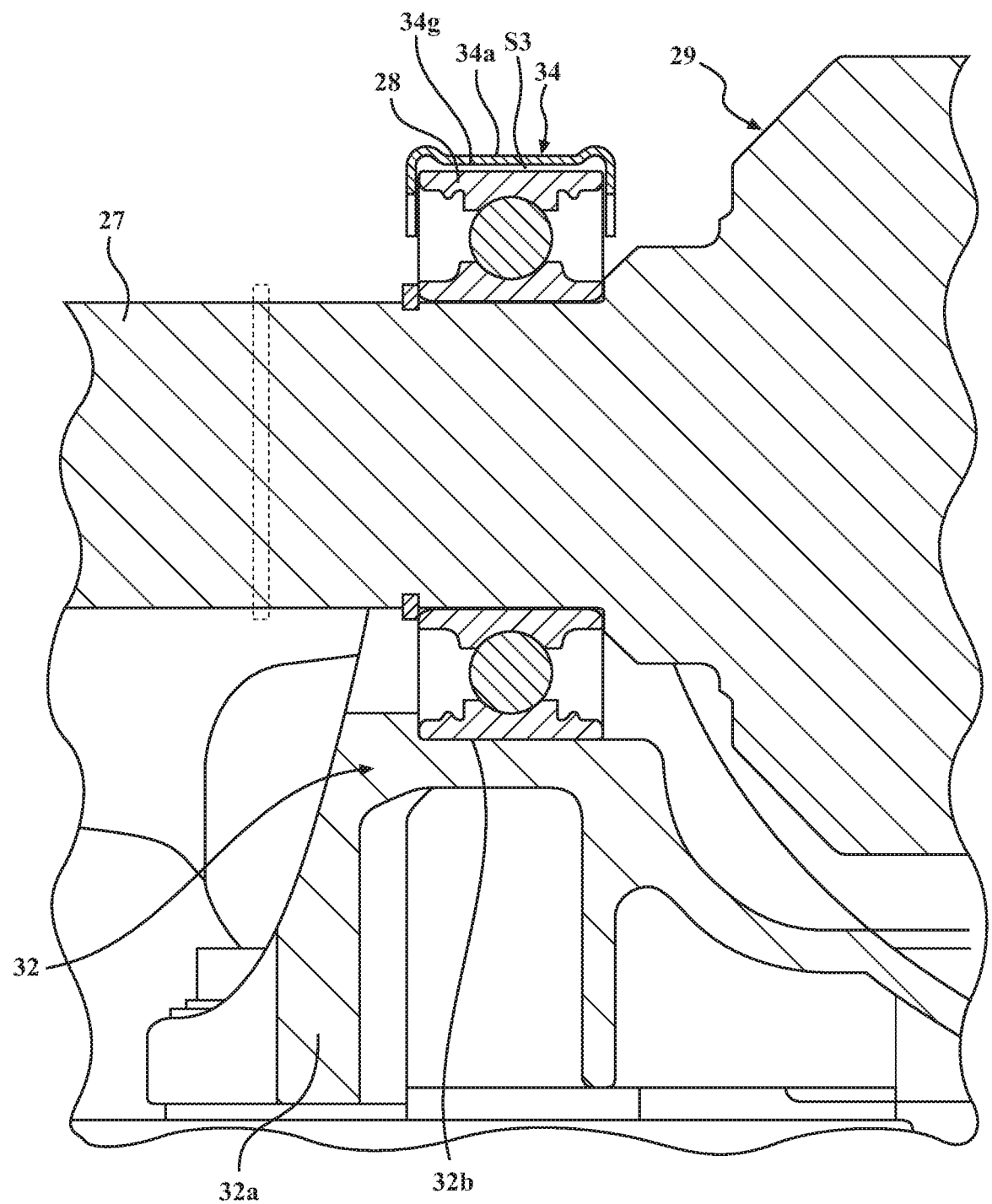
FIG. 5 is a schematic cross-sectional side view of the drive shaft bearing support assembly of FIGS. 1 and 2.
Figure 6:
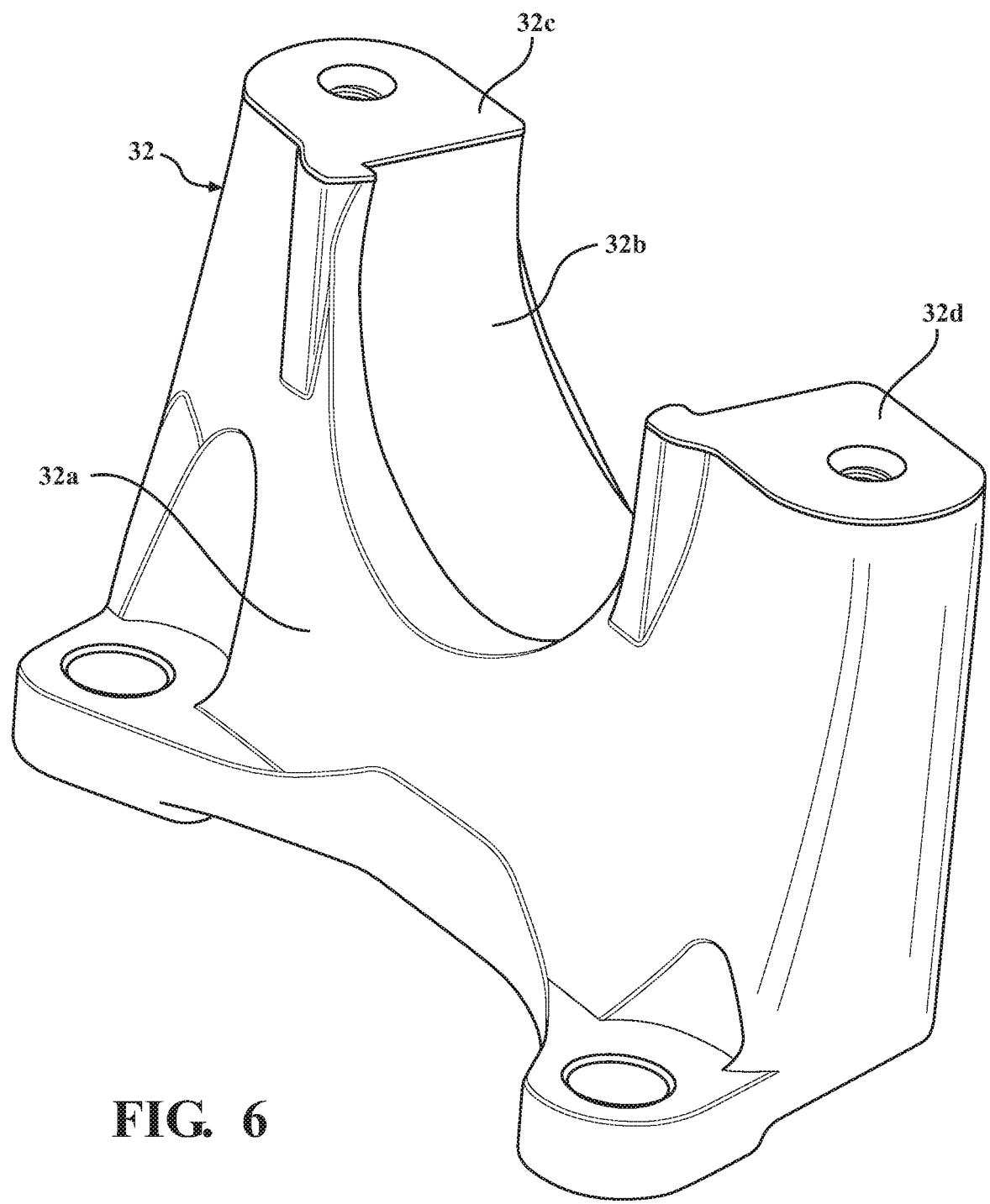
FIG. 6 is a perspective view of the bearing support housing shown in FIGS. 1 and 2.
Figure 7:
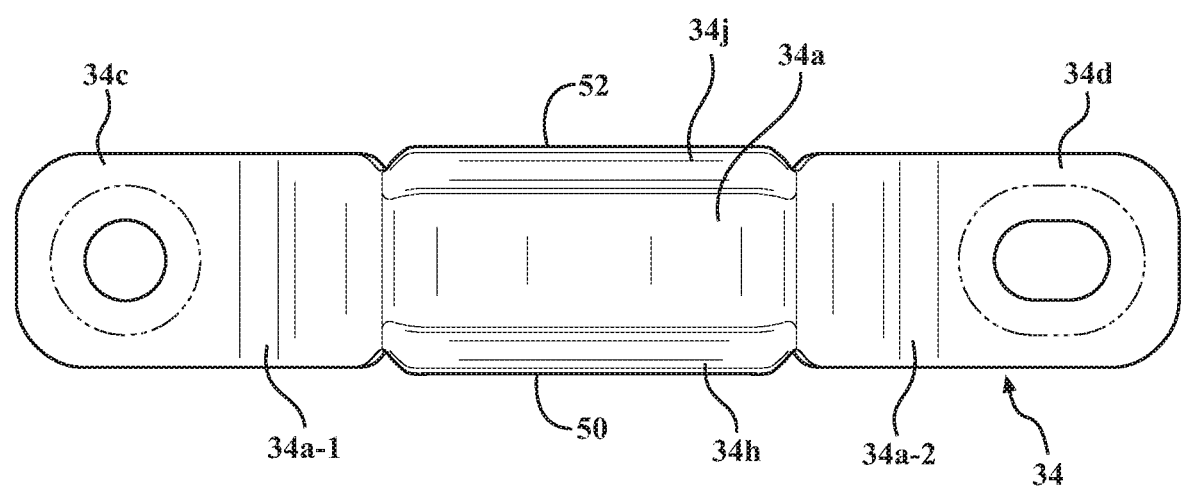
FIG. 7 is a schematic plan view of a bearing support housing cap in accordance with an embodiment described herein.

Referring in particular to FIG. 3, in one or more arrangements, the first housing cap attachment surface 32c may be structured such that a first flat plane P1 extending along the first housing cap attachment surface 32c is spaced apart or offset from a second flat plane P2 extending parallel to the first flat plane P1 and through a rotational axis X1 of the bearing 28 received in the bearing support housing cavity 32b. Also, in one or more arrangements, the second housing cap attachment surface 32d may be structured so as to be coplanar with the first housing cap attachment surface 32c along the first flat plane P1. This offset of the first and second housing cap attachment surfaces 32c, 32d from the bearing rotational axis X1 provides a relatively deep cavity 32b for receiving and containing the bearing 28 therein. The relative depth of the cavity 32b may make it more difficult for the bearing 28 to completely exit the cavity if a portion of the bearing support housing cap 34 becomes damaged or detached from the bearing support housing 32 during use of the drive shaft.

Referring to the drawings, the bearing support housing cap 34 may be structured to be securable to the bearing support housing 32 to secure the bearing 28 in the housing cavity 32b. The various embodiments of the cap described herein may have a multi-radius structure designed to contact a bearing positioned in the bearing support housing so as to provide multiple discrete regions of contact between the bearing and the cap.

In one or more arrangements, the bearing support housing cap 34 may include a bearing support portion 34a having a first end 34a-1 and a second end 34a-2 opposite the first end. First housing cap securement portion 34c may extend from the bearing support portion first end 34a-1, and second housing cap securement portion 34d may extend from the bearing support portion second end 34a-2.

Referring to FIGS. 1-10, and in embodiments described herein, the bearing support housing cap 34 may be structured to contact the bearing 28 only along discrete regions of contact Z when the cap 34 is secured to the bearing support housing 32 to secure the bearing 28 in the bearing support housing 32. Each discrete region of contact Z may be a continuous, uninterrupted region of contact. These discrete regions of contact Z may be separated from each other by non-contact regions as described herein. In one or more arrangements, each of the discrete contact regions Z may have the shape of a line segment formed by the intersection of the outermost surface 28s of the bearing and an opposed surface of the bearing support housing cap 34 in direct contact with the bearing 28.

The bearing support housing cap 34 may also be structured to be spaced apart from the bearing 28 at locations other than the discrete regions of contact when the cap 34 is secured to the bearing support housing 32 to secure the bearing 28 in the bearing support housing. These spaced apart regions S form regions of no contact (or "non-contact regions") between the bearing 28 and the bearing support housing cap 34. Each of the regions of contact Z between the bearing 28 and the bearing support housing cap 34 may be positioned between a pair of the arcuately spaced-apart non-contact regions S (i.e., regions where the bearing support housing cap 34 is spaced apart from the bearing 28) when the cap 34 is secured to the bearing support housing 32 to secure the bearing 28 in the bearing support housing.

For example, in one or more arrangements and as seen in the drawings, the bearing support housing cap 34 may be structured to contact the bearing 28 along only two discrete regions of contact Z1 and Z2 when the cap 34 is secured to the bearing support housing 32 to secure the bearing 28 in the bearing support housing cavity 32b. The bearing support portion 34a of bearing support housing cap 34 may include a first surface 34e and a second surface 34f. The bearing support portion first surface 34e may be structured to contact the bearing 28 along a first discrete region of contact Z1 when the bearing support housing cap 34 is secured to the bearing support housing 32 to secure the bearing in the housing cavity 32b. The bearing support portion second surface 34f may be structured to contact the bearing 28 along a second discrete region of contact Z2 separate from the first discrete region of contact Z1 when the bearing support housing cap 34 is secured to the bearing support housing 32 to secure the bearing 28 in the housing cavity 32b.

The first surface 34e may have a first surface radius 34e-r, and the second surface 34f may have a second surface radius 34f-r. The first surface radius 34e-r may be larger than a radius (i.e., the outermost radius 28r) of a surface 28s of the bearing to be contacted by the bearing support portion first surface 34e. Also, the second surface radius 34f-r may be larger than a radius (i.e., the outermost radius 28r) of a surface 28s of the bearing 28 to be contacted by the bearing support portion second surface 34f. In one or more arrangements, the first surface radius 34e-r and the second surface radius 34f-r may be equal, within applicable manufacturing tolerance limits. In a particular embodiment, the bearing support portion first surface radius 34e-r is equal to 1.3×R (i.e., 1.3 multiplied by the value of R)(within applicable manufacturing tolerance limits) and the bearing support portion second surface radius 34f-r is also equal to 1.3×R (within applicable manufacturing tolerance limits), where R is equal to the value of the radius 28r of the outermost surface 28s of the bearing 28 to be contacted by the bearing support portion first and second surfaces 34e, 34f. In one or more arrangements, the bearing support portion first surface radius 34e-r and second surface radius 34f-r may be within the range (1.3×R)±(0.13×R) (i.e., within a tolerance zone of ±10% of the value of 1.3×R, inclusive) for effective operation of the bearing support housing cap for the purposes described herein.

It has been found that, in the arrangements shown in FIGS. 1-10, bearing support portion first and second surfaces 34e and 34f having radii equal to 1.3×R as just described have been particularly suitable for minimizing stresses on the bearing support assembly 30 while maintaining the desired discrete contact regions Z1 and Z2 with the bearing 28 during thermal expansion of the bearing support assembly components, during operation of the drive shaft 27. In addition, this arrangement has been shown to aid in minimizing variation in contact forces between the housing cap and the bearing over a relatively wide range of temperatures during thermal expansion of the bearing support assembly components.

In general, the bearing support housing cap 34 may be structured in accordance with a desired configuration of the bearing support assembly 30, so as to appropriately locate the first and second contact regions Z1, Z2 when the bearing support housing cap 34 is secured to the bearing support housing 32 to secure the bearing 28 in the bearing support housing 32. Desirable locations of the first and second discrete contact regions Z1, Z2 between the bearing support housing cap 34 and the bearing 28 may be determined analytically and/or iteratively by suitable experimentation so as to help ensure that the contact regions are maintained during use of the drive shaft 27. For example, it is desirable that the discrete contact regions Z1, Z2 between the bearing support housing cap 34 and the bearing 28 be maintained as described herein in spite of forces exerted on the bearing support housing assembly elements by the drive shaft 27, and in spite of stresses imposed on the assembly elements by thermal expansion of the various components.

In the embodiments shown in FIGS. 1-10, the bearing support housing cap 34 may be structured so that the first contact region Z1 resides at a location spaced angularly apart 45° (within tolerance limits) from the plane P2 extending through the rotational axis X1 of the bearing 28. Also, the bearing support housing cap 34 may be structured so that the second contact region Z2 resides at a location spaced angularly apart 45° (within tolerance limits) from the plane P2 extending through the rotational axis X1 of the bearing. This configuration spaces the first and second contact regions Z1, Z2 angularly apart 90°, within applicable manufacturing tolerance limits. It has been found that, in the arrangements shown in FIGS. 1-10, this positioning of the first and second contact regions Z1, Z2 has been particularly effective in maintaining the desired discrete contact regions with the bearing during thermal expansion of the bearing support assembly components over a wide range of temperatures during operation of the drive shaft. This positioning of the first and second contact regions Z1, Z2 has also been found to be particularly effective in maintaining substantially constant contact forces between the housing cap 34 and the bearing 28 over a wide range of temperatures, during operation of the drive shaft. In one or more arrangements, the angular spacing between the first and second contact regions Z1, Z2 may be within the range of 90°±13.5° inclusive for effective operation of the bearing support housing cap for the purposes described herein.

The bearing support housing cap 34 may also be structured to be spaced apart from the bearing 28 at locations other than the first discrete region of contact Z1 and the second discrete region of contact Z2 when the cap 34 is secured to the bearing support housing 32 to secure the bearing 28 in the bearing support housing. More particularly, each of the regions of contact Z1, Z2 between the bearing 28 and the bearing support housing cap 34 may be positioned between a pair of angularly spaced-apart non-contact regions S (i.e., regions where the bearing support housing cap 34 is spaced apart from the bearing 28).

Figure 8:
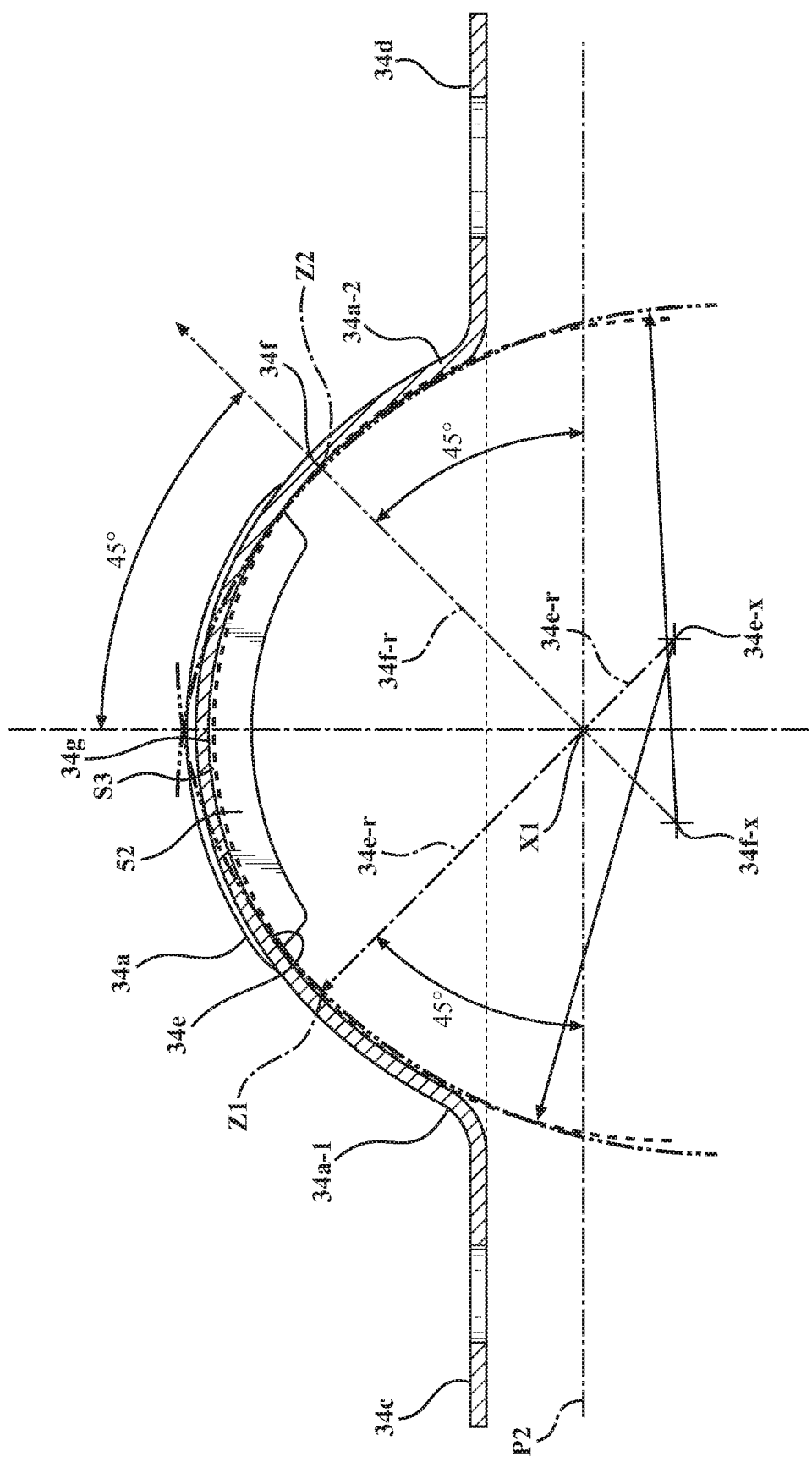
FIG. 8 is a schematic cross-sectional end view of the bearing support housing cap shown in FIG. 7 showing relationships between various radii of the bearing support housing cap and an outermost radius of a bearing when the bearing is secured in a bearing support housing.
Figure 9:
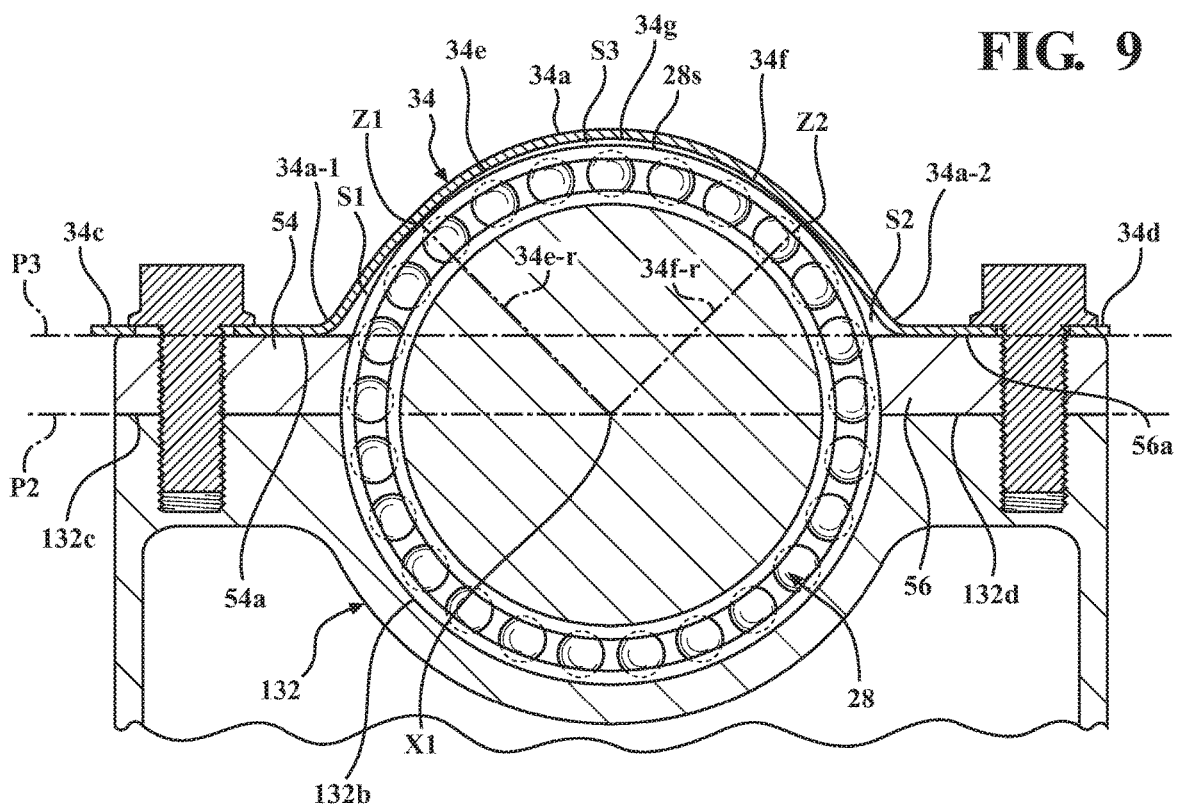
FIG. 9 is a schematic cross-sectional end view of a drive shaft bearing support assembly in accordance with another embodiment described herein.
Figure 10:
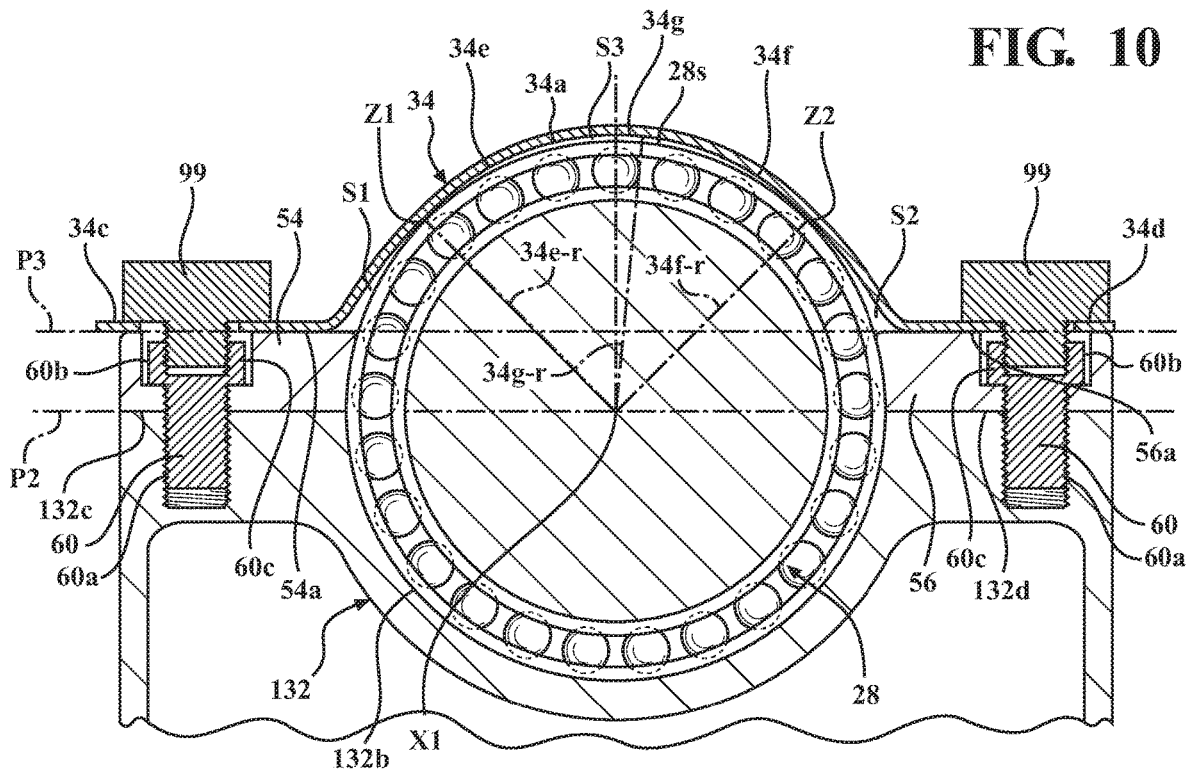
FIG. 10 is a schematic cross-sectional end view of a drive shaft bearing support assembly in accordance with yet another embodiment described herein.

For example, as seen in FIGS. 3, 8, 9, and 10, the bearing support housing cap 34 may be structured such that the bearing support portion first end 34a-1, the first securement portion 34c, and the bearing support portion first surface 34a are spaced apart from the bearing 28 along one side of first contact zone Z1 when the bearing support housing cap 34 is secured to the bearing support housing 32. This configuration forms the spaced-apart region 51 (FIGS. 3, 9, and 10, for example). Also, the bearing support housing cap 34 may be structured such that the bearing support portion second end 34a-2, the second securement portion 34d, and the bearing support portion second surface 34f are spaced apart from the bearing along one side of second contact zone Z2, when the bearing support housing cap 34 is secured to the bearing support housing 32. This configuration forms the spaced-apart region S2 (FIGS. 3, 9, and 10, example).

In addition, the bearing support housing cap 34 may also be structured so as to be spaced apart from the bearing 28 along a third non-contact region S3 formed between the first contact region Z1 and the second contact region Z2, when the bearing support housing cap 34 is secured to the bearing support housing 32. To provide this third non-contact region S3, the bearing support portion 34a may include a third surface 34g extending between or spanning a distance between the first surface 34e and the second surface 34f, and having a third surface radius 34g-r. The third surface 34g may be structured to reside opposite and spaced apart from the bearing 28 when the bearing support housing cap 34 is secured to the bearing support housing 32 to secure the bearing 28 in the housing cavity 32b. In one or more arrangements, the third surface radius 34g-r may be controlled so as to minimize a distance between the bearing 28 and the third surface 34g, while maintaining some degree of spacing between the bearing 28 and the third surface 34g during operation of the engine and rotation of the drive shaft 27. In one or more arrangements, the third surface radius 34g-r may be equal to or greater than the outermost radius 28r of the bearing contacted by the first and second surfaces.

Referring to FIG. 8, to provide the configuration shown in FIGS. 1-10, the housing cap 34 may be structured so that the central axis 34e-x of the bearing support portion first surface radius 34e-r is offset from the rotational axis X1 of the bearing 28 when the cap 34 is applied to the housing 32 to secure the bearing 28 in the housing. The housing cap 34 may also be structured so that the central axis 34f-x of the bearing support portion second surface radius 34f-r is offset from the rotational axis X1 of the bearing 28 when the cap 34 is applied to the housing 32 to secure the bearing 28 in the housing.

In one or more arrangements, the bearing support portion first surface 34e may be structured such that the central axis 34e-x of the first surface radius 34e-r is parallel with and spaced apart from the rotational axis X1 of the bearing 28 when the bearing support housing cap 34 is secured to the bearing support housing 32 to secure the bearing 28 in the cavity 32b. Also, the bearing support portion second surface 34f may be structured such that the central axis 34f-x of the second surface radius 34f-r is parallel with and spaced apart from the rotational axis X1 of the bearing 28 when the bearing support housing cap 34 is secured to the bearing support housing 32 to secure the bearing 28 in the cavity 32b. As seen in FIG. 8, the central axes of the first and second surface radii 34e-r, 34f-r may be offset in opposite directions from the rotational axis X1 of the bearing.

Bearing support housing cap 34 may also include a first lip 50 extending from a first edge 34h of the bearing support housing cap, and a second lip 52 extending from a second edge 34j of the bearing support housing cap 34 opposite the first edge 34h. The second lip 52 may extend opposite the first lip 50 to form a pocket structured to receive a portion of the bearing 28 therebetween when the bearing support housing cap 34 is secured to the bearing support housing 32 to secure the bearing 28 in the housing cavity 32b. The lips 50, 52 may aid in maintaining the bearing 28 in a secured position within the bearing support housing cavity 32b.

The bearing support housing cap 34 may be formed from any material or materials suitable for the purposes described herein, using any suitable fabrication method(s) (for example, stamping and/or other forming operations, machining, die casting, and/or any other suitable methods). In one or more embodiments, the bearing support housing cap 34 is formed from steel.

Referring to FIGS. 9 and 10, in one or more alternative arrangements, a bearing support housing 132 may be provided. The bearing support housing 132 may have a structure similar to the structure of housing 32 previously described, except that housing cap attachment surfaces 132c, 132d of housing 132 may be structured so that a flat plane P2 passing through the bearing rotational axis X1 also extends along one or more of the attachment surfaces 132c, 132d. Thus, the housing 132 may not have the elevated housing cap attachment surfaces of the housing 32 previously described.

A spacer may be interposed between one or more of the bearing support housing cap first and second securement portions 34c, 34d and an associated housing cap attachment surface 132c, 132d on the bearing support housing. The spacer(s) may be structured to enable securement of both the spacer and a portion of the bearing support housing cap 34 to the bearing support housing 132. Each spacer may be structured to be interposable between the bearing support housing 132 and the bearing support housing cap 34, and so as to enable securement of the spacer to the bearing support housing 132. Each spacer may also include a housing cap attachment surface structured to provide a location for attachment of a portion of the bearing support housing cap 34 to the spacer, in the manner previously described with regard to the surfaces 32c, 32d of housing 32.

For example, FIG. 9 shows a pair of spacers 54, 56 incorporated into the bearing support assembly. A first spacer 54 may be positioned between the first housing cap securement portion 34c and the first housing cap attachment surface 132c, and a second spacer 56 may be positioned between the second housing cap securement portion 34d and the second housing cap attachment surface 132d.

In one or more arrangements, and as shown in FIG. 9, the first spacer 54 may include a first spacer housing cap attachment surface 54a structured to provide a location for attachment of first housing cap securement portion 34c to the first spacer 54. The second spacer 56 may include a second spacer housing cap attachment surface 56a structured to provide a location for attachment of first housing cap securement portion 34d to the second spacer 56. Also, the first spacer 54 and the second spacer 56 may be structured so that the first spacer housing cap attachment surface 54a and the second spacer housing cap attachment surface 56a are coplanar (for example, along a plane P3) when the first and second spacers 54, 56 are secured to the bearing support housing. The use of spacers as described herein may enable a drive shaft bearing support housing cap having the capabilities and advantages described herein to be retrofit onto a different type of drive shaft support housing, in which the housing cap attachment surfaces are aligned with the bearing rotational axis X1 as shown in FIG. 9.

Referring to FIG. 9, in one or more arrangements, spacers 54, 56 may be attached to the bearing support housing 132 at the same time as the bearing support housing cap 34, and using common fasteners or other suitable means. Referring to FIG. 10, in one or more alternative arrangements, a spacer may be structured to be securable to the bearing support housing independently of the bearing support housing cap. For example, a spacer 54 may be attached to the bearing support housing 132 using a bolt extender 60 having a threaded portion 60a for engagement with a complementarily internally threaded portion of the housing 132. The bolt extender 60 may also have a hollow head 60b including an internally threaded wall 60c structured to engage a complementarily threaded bolt 99 usable to secure the bearing support housing cap 34 to the spacer 56.

Figure 11:
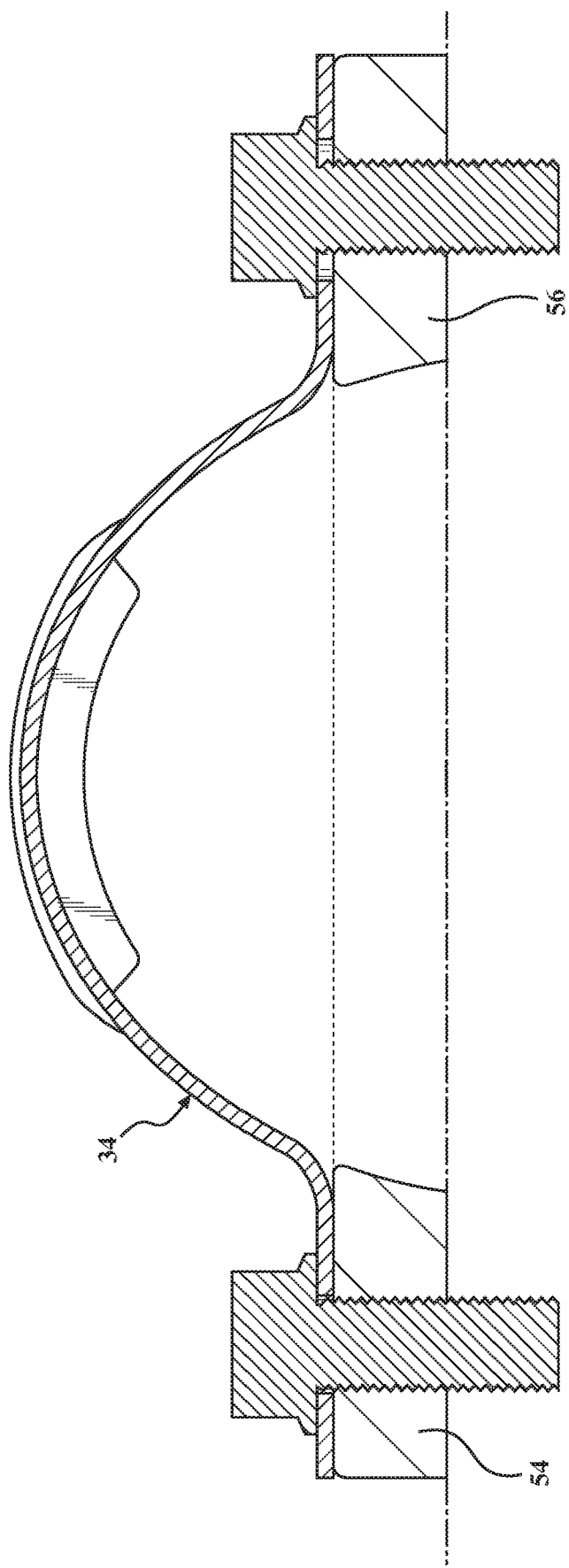
FIG. 11 is a schematic cross-sectional end view of a bearing support housing cap sub-assembly in accordance with an embodiment described herein.

Referring to FIG. 11, in one or more arrangements, a bearing support housing cap sub-assembly may be formed by securing one or more spacers 54, 56 to the bearing support housing cap 34 prior to attachment of the spacer(s) 54, 56 and the bearing support housing cap 34 to the bearing support housing 132. The spacer(s) 54, 56 may be attached to the bearing support housing cap 34 using any suitable attachment means, for example, welding or adhesive application.

Figure 12:
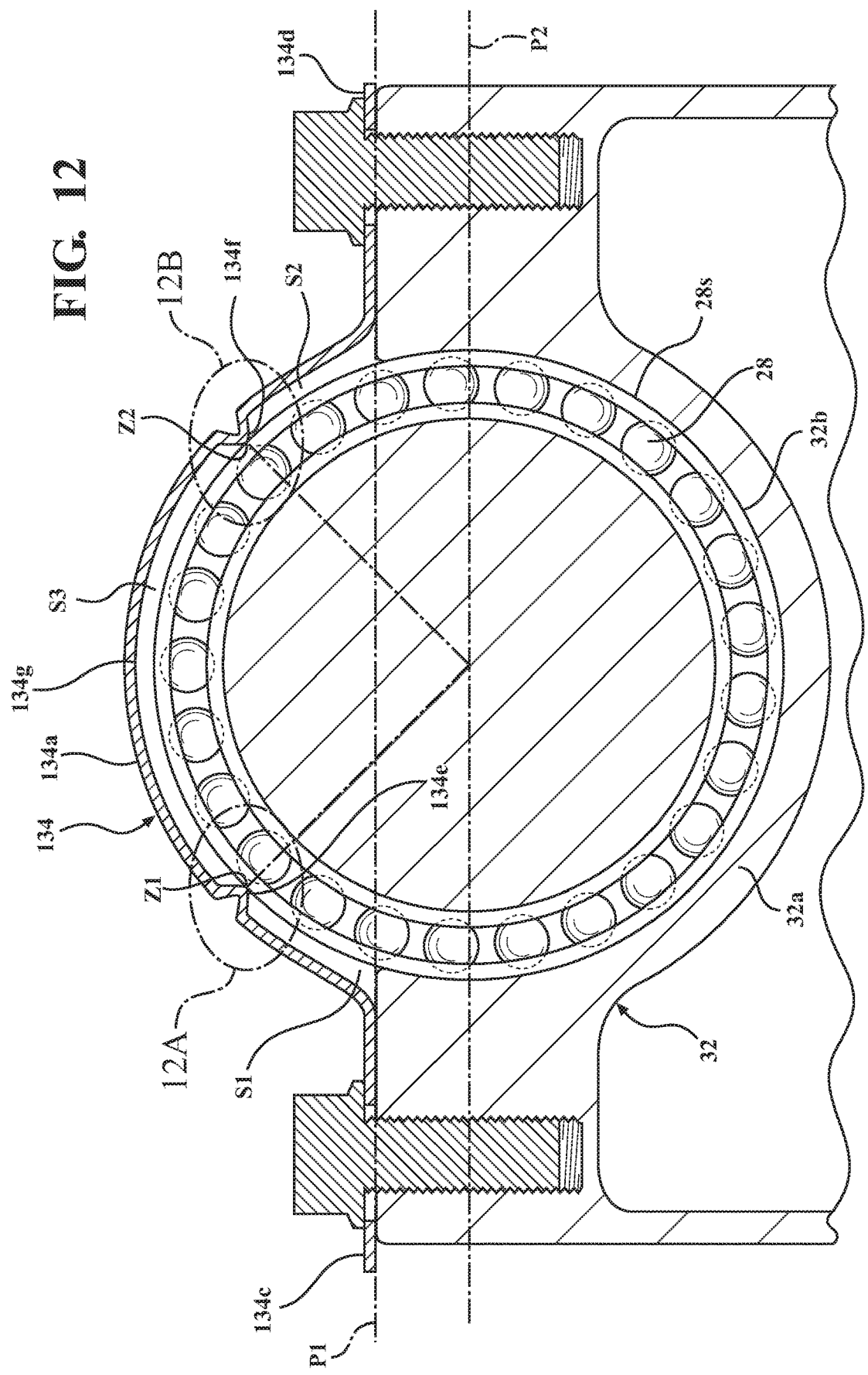
FIG. 12 is a schematic cross-sectional end view of a drive shaft bearing support assembly including an alternative embodiment of a bearing support housing cap.
Figure 12A:
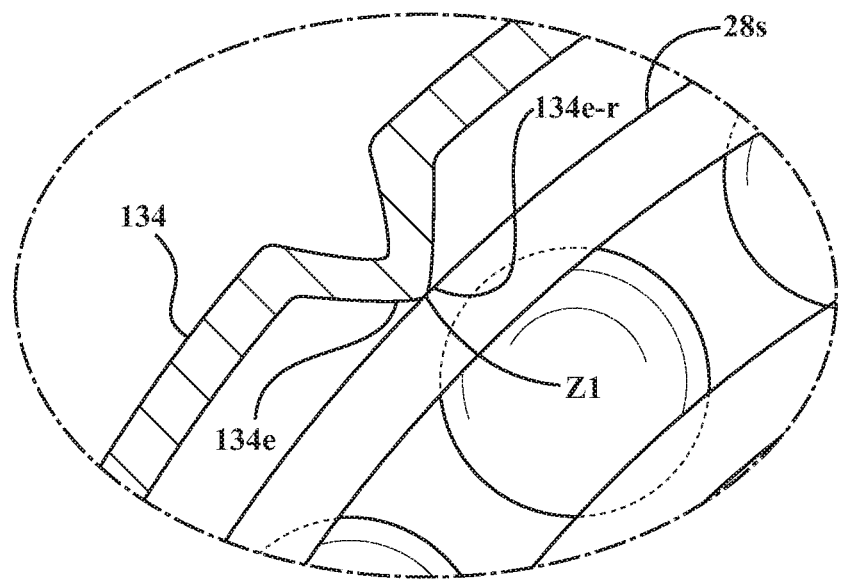
FIG. 12A is a magnified view of the bearing support housing cap of FIG. 12 showing a bearing support portion first surface of the bearing support housing cap.
Figure 13A:
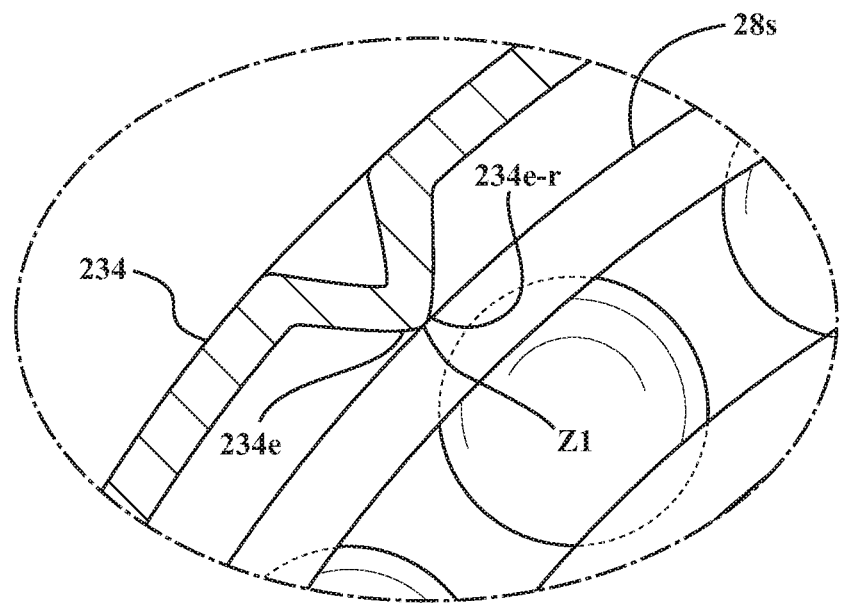
FIG. 13A is a magnified view of the bearing support housing cap of FIG. 13 showing a bearing support portion first surface of the bearing support housing cap.
Figure 13B:
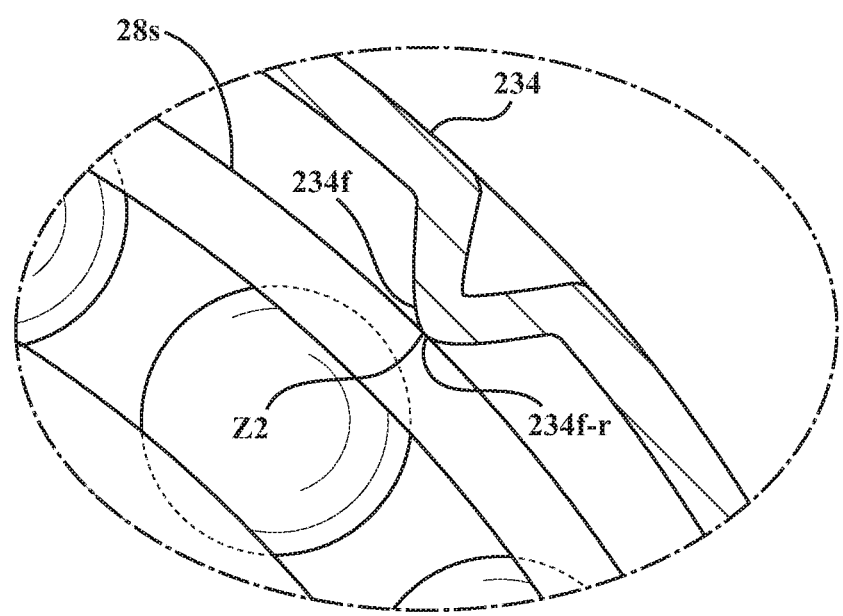
FIG. 13B is a magnified view of the bearing support housing cap of FIG. 13 showing a bearing support portion second surface of the bearing support housing cap.

FIGS. 12-13B show possible alternative arrangements for providing discrete regions of contact between a bearing support housing cap and a bearing 28.

Figure 12B:
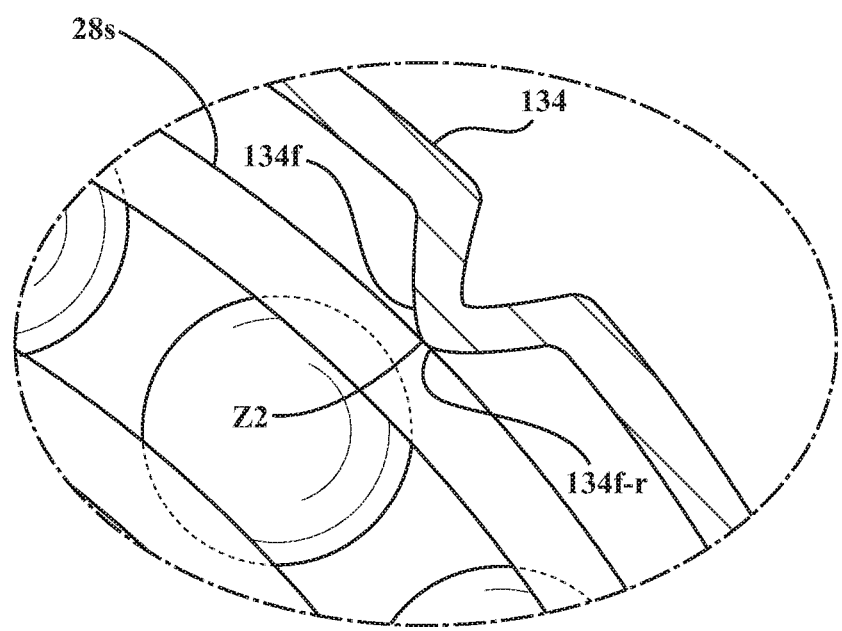
FIG. 12B is a magnified view of the bearing support housing cap of FIG. 12 showing a bearing support portion second surface of the bearing support housing cap.

In the embodiment shown in FIGS. 12-12B, the bearing support housing cap 134 may include a bearing support portion 134a, a first securement portion 134c, and a second securement portion 134d as previously described with respect to bearing support housing cap 34. A bearing support portion first surface 134e may be structured to contact the bearing 28 along a first discrete region of contact Z1 when the bearing support housing cap 134 is secured to the bearing support housing 32 to secure the bearing in the housing cavity 32b. The first surface 134e may have a first radius 134e-r at a location on first surface 134e structured for contact with the bearing outermost surface 28s. The radius 134e-r may be smaller than a radius of a surface 28s of the bearing 28 to be contacted by the bearing support portion first surface 134e. In addition, the bearing support housing cap 134 may have a second surface 134f structured to contact the bearing 28 along a second discrete region of contact Z2 separate from the first discrete region of contact Z1 when the bearing support housing cap 134 is secured to the bearing support housing 32 to secure the bearing in the cavity 32b. The second surface 134f may have a second radius 134f-r at a location on second surface 134f structured for contact with the bearing outermost surface 28s. The radius 134f-r may be smaller than a radius of a surface of the bearing 28 to be contacted by the bearing support portion second surface 134f.

In the embodiment shown in FIGS. 12-12B, the first and second surfaces 134e and 134f may be provided by forming folds in the cap 134 at locations selected for the contact regions Z1, Z2 in the manner previously described. Radii 134e-r and 134f-r may be formed at tips of the folds contacting the bearing. Each of these radii may be smaller than the radius 28r of the bearing outermost surface 28s contacted by the cap 134. The folds may extend along an entire width of the cap between edges 34h and 34j.

In the embodiment shown in FIGS. 13-13B, the bearing support housing cap 234 may include a bearing support portion 234a, a first securement portion 234c, and a second securement portion 234d as previously described with respect to bearing support housing cap 34. A bearing support portion first surface 234e may be structured to contact the bearing 28 along a first discrete region of contact Z1 when the bearing support housing cap 234 is secured to the bearing support housing 32 to secure the bearing in the housing cavity 32b. The first surface 234e may have a first radius 234e-r at a location on first surface 234e structured for contact with the bearing outermost surface 28s. The radius 234e-r may be smaller than a radius of a surface 28s of the bearing 28 to be contacted by the bearing support portion first surface 234e. In addition, the bearing support portion 234a may have a second surface 234f structured to contact the bearing 28 along a second discrete region of contact Z2 separate from the first discrete region of contact Z1 when the bearing support housing cap 234 is secured to the bearing support housing 32 to secure the bearing in the cavity 32b. The second surface 234f may have a second radius 234f-r at a location on second surface 234f structured for contact with the bearing outermost surface 28s. The radius 234f-r may be smaller than a radius of a surface 28s of the bearing 28 to be contacted by the bearing support portion second surface 234f.

In the embodiment shown in FIGS. 13-13B, the bearing support portion first and second surfaces 234e and 234f providing the contact regions Z1, Z2 between the bearing support housing cap 234 and the bearing 28 may be provided by embossing or pressing localized indentations or dimples into the material of the cap 234 at locations selected for the contact regions Z1, Z2 in the manner previously described. Radii 234e-r and 234f-r may be formed at the tips of the dimples contacting the bearing 28. Each of these radii may be smaller than the radius 28r of the bearing outermost surface 28s contacted by the cap 234. The dimples may be formed in portions of the cap material spaced apart from the edges 34h, 34j of the cap.

Figure 14:
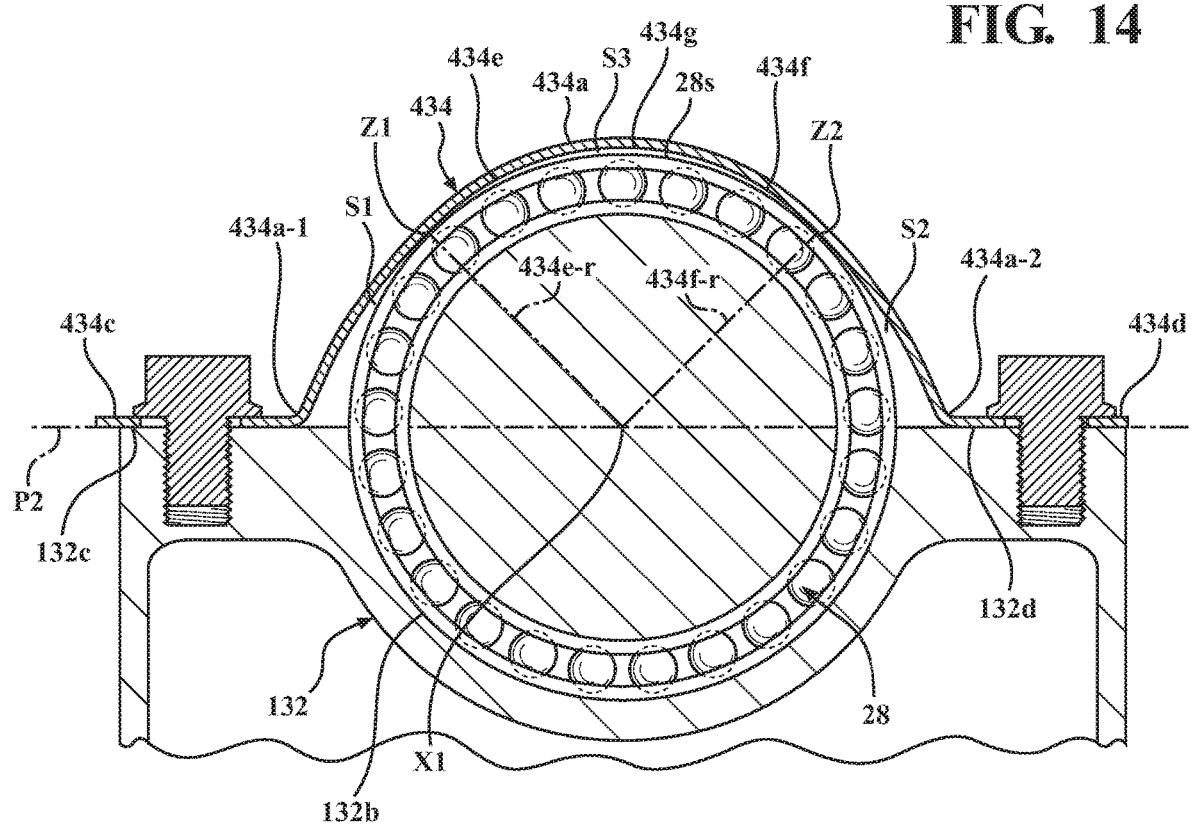
FIG. 14 is a schematic cross-sectional end view of a drive shaft bearing support assembly in accordance with yet another embodiment described herein.

Referring now to FIG. 14, in one or more alternative arrangements, a bearing support housing 132 as previously described with respect to FIG. 9 may be provided. In addition, a bearing support housing cap 434 may be structured to be securable to the bearing support housing 132 to secure the bearing 28 in the housing cavity 132b. The bearing support housing cap 434 may be structured in a manner similar to the previously-described bearing support housing cap 34 (for example, including the multi-radius structure designed to contact a bearing positioned in the bearing support housing so as to provide multiple discrete regions of contact between the bearing and the cap, and other features), except as described herein. The bearing support housing cap 434 may also be structured to contact the bearing 28 only along discrete regions of contact Z1 and Z2 located as previously described, and may otherwise operate in the same manner as the embodiments shown in FIGS. 3 and 9, previously described. However, in the drive shaft bearing support assembly embodiment shown in FIG. 14, spacers 54 and 56 are eliminated, and the ends 434a-1 and 434a-2 of bearing support portion 434a may be extended toward respective ones of coplanar housing cap attachment surfaces 132c, 132d along plane P2, until the ends of the bearing support portion 434a reach the housing cap attachment surfaces. First housing cap securement portion 434c may extend from the bearing support portion first end 434a-1, and second housing cap securement portion 434d may extend from the bearing support portion second end 434a-2. The bearing support housing cap 434 may be attached to the bearing support housing 132 by first housing cap securement portion 434c and second housing cap securement portion 434d, in the manner previously described.

In one or more arrangements, the radius of bearing support portion first surface 434e at first discrete region of contact Z1 may be maintained when extending bearing support portion first end 434a-1 toward housing cap attachment surface 132c, and the radius of bearing support portion second surface 434f at second discrete region of contact Z2 may be maintained when extending bearing support portion second end 434a-2 toward housing cap attachment surface 132d.

The embodiment 434 of the bearing support housing cap shown in FIG. 14 may be applied to a bearing support housing having housing cap attachment surfaces 132c, 132d extending along (or coplanar with) a plane P2 passing through the rotational axis X1 of the bearing 28 received in housing cavity 132b, while providing the same benefits as the bearing support housing cap embodiment shown in FIGS. 3 and 9. This enables the bearing support housing cap 434 to be applied, for example, as a retrofit to a bearing support housing having housing cap attachment surfaces extending along a plane passing through the rotational axis of the bearing, and otherwise enables a bearing support housing cap having the features described herein to be used with a greater variety of bearing support housing designs.

It should be understood that the preceding is merely a detailed description of various embodiments of this invention and that numerous changes to the disclosed embodiments can be made in accordance with the disclosure herein without departing from the spirit or scope of the invention. Thus, the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A drive shaft bearing support assembly comprising:
a bearing support housing structured to be mountable to a portion of a vehicle, the bearing support housing defining a cavity structured for receiving a portion of a bearing therein; and
a bearing support housing cap structured to be securable to the bearing support housing to secure the portion of the bearing in the cavity,
wherein the bearing support housing cap includes a first surface structured to contact the bearing along a first discrete region of contact when the bearing support housing cap is secured to the bearing support housing to secure the bearing in the cavity, the first surface having a radius of curvature larger than a radius of a surface of the bearing to be contacted by the housing cap first surface, and wherein the bearing support housing cap also has a second surface structured to contact the bearing along a second discrete region of contact separate from the first discrete region of contact when the bearing support housing cap is secured to the bearing support housing to secure the bearing in the cavity, the second surface having a radius of curvature larger than a radius of a surface of the bearing to be contacted by the housing cap second surface.

2. The support assembly of claim 1 further comprising at least one spacer structured to be interposable between the bearing support housing and the bearing support housing cap, and so as to enable securement of the at least one spacer to the bearing support housing, the at least one spacer including a housing cap attachment surface structured to provide a location for attachment of a portion of the bearing support housing cap to the at least one spacer.

3. The support assembly of claim 2 wherein the at least one spacer comprises a first spacer and a second spacer, the first spacer including a first spacer housing cap attachment surface structured to provide a location for attachment of a first portion of the bearing support housing cap to the first spacer, the second spacer including a second spacer housing cap attachment surface structured to provide a location for attachment of a second portion of the bearing support housing cap to the second spacer, wherein the first spacer and the second spacer are structured so that the first spacer housing cap attachment surface and the second spacer housing cap attachment surface are coplanar when the first and second spacers are secured to the bearing support housing.

4. The support assembly of claim 2 wherein the at least one spacer is structured to be securable to the bearing support housing independently of the bearing support housing cap.

5. The support assembly of claim 2 wherein the at least one spacer is secured to the bearing support housing cap prior to attachment of the at least one spacer and the bearing support housing cap to the bearing support housing.

6. The support assembly of claim 1 wherein the bearing support housing includes a first housing cap attachment surface structured to provide a location for attachment of a first portion of the bearing support housing cap to the bearing support housing, wherein the first housing cap attachment surface is structured such that a first flat plane extends along the first housing cap attachment surface, wherein a second flat plane spaced apart from the first flat plane extends parallel to the first flat plane, and wherein only the second flat plane extends through a rotational axis of a bearing received in the cavity.

7. The support assembly of claim 6 wherein the bearing support housing includes a second housing cap attachment surface structured to provide a location for attachment of a second portion of the bearing support housing cap to the bearing support housing, and wherein the second housing cap attachment surface is structured so as to be coplanar with the first housing cap attachment surface along the first flat plane.

8. The support assembly of claim 1 wherein the two discrete regions of contact are angularly spaced apart by 90±13.5 degrees inclusive.

9. The support assembly of claim 1 wherein the housing cap first surface radius is within a range $(1.3 \times R) \pm (0.13 \times R)$ inclusive, where R=a radius of an outermost surface of the bearing to be contacted by the housing cap.

10. The support assembly of claim 9 wherein the housing cap second surface radius is within a range $(1.3 \times R) \pm (0.13 \times R)$ inclusive.

11. The support assembly of claim 1 wherein the first surface radius and the second surface radius are equal.

12. The support assembly of claim 1 wherein the bearing support housing cap first surface is structured such that a central axis of the first surface radius is parallel with and spaced apart from a rotational axis of the bearing when the bearing support housing cap is secured to the bearing support housing to secure the bearing in the cavity, and wherein the bearing support housing cap second surface is structured such that a central axis of the second surface radius is parallel with and spaced apart from a rotational axis of the bearing when the bearing support housing cap is secured to the bearing support housing to secure the bearing in the cavity.

13. The support assembly of claim 1 wherein the bearing support housing cap comprises a bearing support portion including the first surface and the second surface, the bearing support portion having a first end and a second end opposite the first end, the bearing support housing cap also including a first securement portion extending from the bearing support portion first end, and a second securement portion extending from the bearing support portion second end,
the first securement portion being structured to enable attachment of the first securement portion to the bearing support housing such that the bearing support portion first end and the first securement portion are spaced apart from the bearing,
and the second securement portion being structured to enable attachment of the second securement portion to the bearing support housing such that the bearing support portion second end and the second securement portion are spaced apart from the bearing.

14. The support assembly of claim 1 wherein the bearing support housing cap includes a third surface residing between the first surface and the second surface, the third surface being structured to reside opposite and spaced apart from the bearing when the bearing support housing cap is secured to the bearing support housing to secure the bearing in the cavity.

15. The support assembly of claim 1 wherein the bearing support housing cap includes a first lip extending from a first edge of the bearing support housing cap, and a second lip extending from a second edge of the bearing support housing cap opposite the first edge, the second lip extending opposite the first lip to form a pocket structured to receive a portion of the bearing therebetween when the bearing support housing cap is secured to the bearing support housing to secure the bearing in the cavity.

16. The support assembly of claim 1 wherein the bearing support housing includes a first housing cap attachment surface structured to provide a location for attachment of a first portion of the bearing support housing cap to the bearing support housing, and a second housing cap attachment surface structured to provide a location for attachment of a second portion of the bearing support housing cap to the bearing support housing, and wherein the first housing cap attachment surface and the second housing cap attachment surface are structured so as to be coplanar with a flat plane extending through a rotational axis of a bearing received in the cavity.

17. A drive shaft bearing support assembly comprising:
a bearing support housing structured to be mountable to a portion of a vehicle, the bearing support housing defining a cavity structured for receiving a portion of a bearing therein; and
a bearing support housing cap structured to be securable to the bearing support housing to secure the portion of the bearing in the cavity,
wherein the bearing support housing cap includes a first surface structured to contact the bearing along a first discrete region of contact when the bearing support housing cap is secured to the bearing support housing to secure the bearing in the cavity, the first surface having a radius of curvature smaller than a radius of a portion of the bearing to be contacted by the housing cap first surface, wherein the bearing support housing cap also has a second surface structured to contact the bearing along a second discrete region of contact separate from the first discrete region of contact when the bearing support housing cap is secured to the bearing support housing to secure the bearing in the cavity, the second surface having a radius of curvature smaller than a radius of a portion of the bearing to be contacted by the housing cap second surface.

18. A cap structured to be securable to a bearing support housing of a bearing support assembly to secure a bearing in the bearing support housing, the cap comprising:
a bearing support portion including a first surface and a second surface, the first surface having a first radius of curvature, the second surface having a second radius of curvature,
the bearing support portion being structured to contact the bearing along the first surface to provide a first discrete region of contact between the bearing support portion and the bearing,
the bearing support portion also being structured to contact the bearing along the second surface to provide a second discrete region of contact between the bearing support portion and the bearing,
the cap also being structured to be spaced apart from the bearing at locations other than the first discrete region of contact and the second discrete region of contact when the cap is secured to the bearing support housing to secure the bearing in the bearing support housing,
wherein the first radius is larger than a radius of a surface of the bearing to be contacted by the bearing support portion first surface, and wherein the second radius is larger than a radius of a surface of the bearing to be contacted by the bearing support portion second surface.

19. The cap of claim 18 further comprising a first securement portion connected to the bearing support portion and structured to enable securement of a first portion of the cap to the bearing support housing, and a second securement portion connected to the bearing support portion and structured to enable securement of a second portion of the cap to the bearing support housing, wherein at least one of the first securement portion and the second securement portion has a spacer secured thereto so as to be interposed between the bearing support housing and at least one of the first securement portion and the second securement portion when the at least one of the first securement portion and the second securement portion is secured to the bearing support housing to secure the bearing in the bearing support housing.

20. The cap of claim 18 wherein the first radius and the second radius are equal.

21. A cap structured to be securable to a bearing support housing of a bearing support assembly to secure a bearing in the bearing support housing, the cap comprising:
a bearing support portion including a first surface and a second surface, the first surface having a first radius of a curvature, the second surface having a second radius of a curvature,
the bearing support portion being structured to contact the bearing along the first surface to provide a first discrete region of contact between the bearing support portion and the bearing,
the bearing support portion also being structured to contact the bearing along the second surface to provide a second discrete region of contact between the bearing support portion and the bearing,
the cap also being structured to be spaced apart from the bearing at locations other than the first discrete region of contact and the second discrete region of contact when the cap is secured to the bearing support housing to secure the bearing in the bearing support housing,
wherein the first radius is smaller than a radius of a surface of the bearing to be contacted by the bearing support portion first surface, and wherein the second radius is smaller than a radius of a surface of the bearing to be contacted by the bearing support portion second surface.

22. The cap of claim 21 wherein at least one of the bearing support portion first surface and the bearing support portion second surface comprises a fold formed in the cap at a location on an associated at least one of the bearing support portion first surface and the bearing support portion second surface, the fold being structured to provide an associated at least one of the first discrete region of contact between the bearing support portion and the bearing and the second discrete region of contact between the bearing support portion and the bearing.

23. The cap of claim 21 wherein at least one of the bearing support portion first surface and the bearing support portion second surface comprises a dimple formed in the cap at a location on an associated at least one of the bearing support portion first surface and the bearing support portion second surface, the dimple being structured to provide an associated at least one of the first discrete region of contact between the bearing support portion and the bearing and the second discrete region of contact between the bearing support portion and the bearing.

* * * * *